US009053456B2

(12) United States Patent
Verthein et al.

(10) Patent No.: US 9,053,456 B2
(45) Date of Patent: Jun. 9, 2015

(54) TECHNIQUES FOR CONFERENCE SYSTEM LOCATION AWARENESS AND PROVISIONING

(75) Inventors: William Verthein, Bellevue, WA (US); Jingyu Qiu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 54 days.

(21) Appl. No.: 13/073,448

(22) Filed: Mar. 28, 2011

(65) Prior Publication Data

US 2012/0254220 A1 Oct. 4, 2012

(51) Int. Cl.
| H04N 7/15 | (2006.01) |
| H04L 12/16 | (2006.01) |
| G06F 15/16 | (2006.01) |
| G06F 17/30 | (2006.01) |
| G06Q 10/10 | (2012.01) |
| H04L 12/18 | (2006.01) |

(52) U.S. Cl.
CPC .............. *G06Q 10/10* (2013.01); *H04N 7/152* (2013.01); *G06F 17/30386* (2013.01); *H04L 12/1822* (2013.01); *H04L 12/1827* (2013.01)

(58) Field of Classification Search
USPC ........................... 348/14.01–14.16, 552–721; 379/1.01–917
See application file for complete search history.

(56) References Cited

U.S. PATENT DOCUMENTS

| 6,735,616 | B1 * | 5/2004 | Thompson et al. ........... 709/204 |
| 7,466,335 | B2 * | 12/2008 | Hirata et al. ............... 348/14.08 |
| 7,554,437 | B2 * | 6/2009 | Axelsen ......................... 340/531 |
| 7,876,714 | B2 * | 1/2011 | Ethier et al. .................. 370/260 |
| 7,881,233 | B2 * | 2/2011 | Bieselin ......................... 370/260 |
| 8,384,757 | B2 * | 2/2013 | Triplett et al. ............. 348/14.07 |
| 8,537,195 | B2 * | 9/2013 | Duckworth et al. ....... 348/14.07 |
| 8,553,064 | B2 * | 10/2013 | MacDonald et al. ...... 348/14.07 |
| 8,854,412 | B2 * | 10/2014 | Tian et al. .................. 348/14.01 |
| 2005/0071213 | A1 * | 3/2005 | Kumhyr et al. .................... 705/8 |
| 2007/0220141 | A1 | 9/2007 | Primm |
| 2008/0162198 | A1 | 7/2008 | Jabbour |
| 2008/0291021 | A1 * | 11/2008 | Bhogal et al. ............... 340/572.1 |
| 2009/0210490 | A1 * | 8/2009 | Hawkins et al. ............... 709/204 |
| 2009/0240770 | A1 * | 9/2009 | Kalipatnapu et al. ......... 709/204 |
| 2010/0149307 | A1 * | 6/2010 | Iyer et al. .................... 348/14.09 |
| 2010/0246448 | A1 * | 9/2010 | Krantz et al. ................. 370/260 |

OTHER PUBLICATIONS

Nazari Shirehjini, Ali A., "A Generic UPnP Architecture for Ambient Intelligence Meeting Rooms and a Control Point allowing for integrated 2D and 3D Interaction", Joint sOc-EUSAI Conference, Oct. 2005, 6 pages.

(Continued)

*Primary Examiner* — Michelle Owyang
(74) *Attorney, Agent, or Firm* — Andrew Smith; Peter Taylor; Micky Minhas

(57) ABSTRACT

Techniques for conference system location awareness and provisioning are described. An apparatus may comprise a room detection component operative to determine a room identifier of a room which a conference system is in, a database component operative to determine one or more room properties of the detected room by querying a database of room properties using the room identifier, and a conference configuration component operative to configure one or more conference elements using the room properties. Other embodiments are described and claimed.

13 Claims, 7 Drawing Sheets

(56) References Cited

OTHER PUBLICATIONS

"Room Scheduling Software That Saves Money", Retrieved on Oct. 29, 2010, 1 page. http://www.netsimplicity.com/room-scheduling-software/.

"Location Appliance", Retrieved Nov. 1, 2010, 2 pages. http://www.trapezenetworks.com/products/location_appliance/.

"Online Meeting Room Scheduling Booking Software System", Retrieved Nov. 1, 2010, 2 pages. http://www.bookmeetingroom.com/room-scheduling-software.

Waibel, Alex et al., "SMaRT: The Smart Meeting Room Task at ISL", Interactive Systems Laboratories, Carnegie Mellon University and Karlsruhe University Germany, 2003, pp. 752-755.

* cited by examiner

TECHNIQUES FOR CONFERENCE SYSTEM LOCATION AWARENESS AND PROVISIONING

BACKGROUND

As Internet bandwidth has improved, online conferencing has grown in popularity. Online conferencing allows for geographically distant people to communicate more naturally than previous long-distance communication solutions like the telephone, e-mail, or instant messaging. However, with existing tools, the process of deploying and configuring online conferencing equipment can be difficult and time consuming, and may require the use of information technology specialists. This may be particularly true for mobile conferencing equipment, which may require configuration particular to a room in which they are deployed, limiting the flexibility of deploying the mobile equipment. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for conference system location awareness and provisioning. Some embodiments are particularly directed to techniques for a conferencing system with location awareness and automatic provisioning. In one embodiment, for example, an apparatus may comprise a room detection component operative to determine a room identifier of a room which a conference system is in, a database component operative to determine one or more room properties of the detected room by querying a database of room properties using the room identifier, and a conference configuration component operative to configure one or more conference elements using the room properties. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
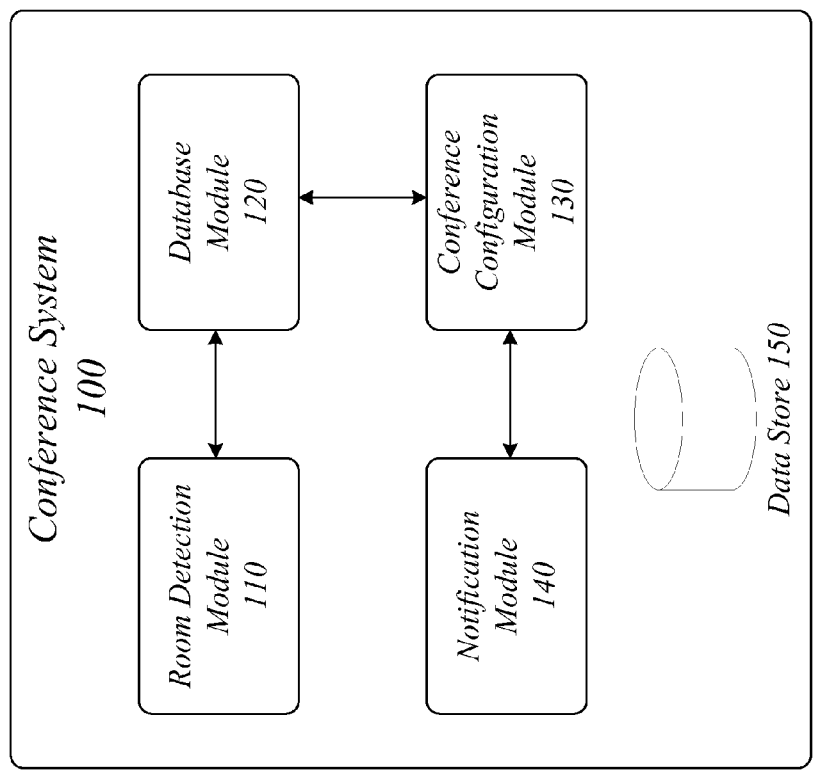
FIG. 1 illustrates an embodiment of a conference system operable for location awareness and provisioning.

Various embodiments are directed to techniques for conference system location awareness and provisioning. Increasing bandwidth has increased the availability and decreased the cost of holding an online conference. Business and social networks are able to decrease the impact of geographic separation by simulating the face-to-face contact that traditionally occurs in work and social relationships.

However, conventional techniques are limited by the amount of work required to configure or provision a conference system and the room in which the conference system is placed. For instance, a conference system may be mobile, in that some elements of the system are designed to be easily moved between rooms, such as on a handcart or inside a rolling cabinet. These mobile elements may include computer hardware configured for use as a conference system, video and audio devices designed for use in conferencing, or other specialty conferencing hardware. Some elements of a conference system or used by a conference system may be stationary in a room. For example, rooms may contain video, audio, or projection systems which may be used during a conference. Adapting the conference system to use these existing elements of a room may require configuration which would conventionally be performed by an information technology specialist, limiting the convenience and increasing the cost of using a mobile conference system.

To solve these and other problems, various embodiments are directed to techniques for conference system location awareness and provisioning. Rather than depending on an information technology specialist to configure the conference system for use in a room, the conference system may be adapted to configure itself. For instance, a conference system may be adapted to determine its geographic location, such as a room having conferencing equipment, through one or more methods such as radio-frequency identification (RFID) active or passive tags, global positioning satellite (GPS) system location techniques, an indoor positioning system, an infrared (IR) tag, cellular triangulation techniques, a visible tag, an invisible tag, and so forth. A database of room properties may be maintained which the conference system can access to determine the properties of the room it is in. In one embodiment, these properties may include any logical properties of the room relevant to the configuration and provisioning of a conference system. In one embodiment, these properties may include any physical properties of the room relevant to the configuration and provisioning of a conference system. For example, properties of the aforementioned video, audio, or projection system may be determined so that these systems may be configured for use with the conference system, eliminating the requirement that an information technology specialist manually configure the conference system. Similarly, the conference system may determine a protocol registration associated with the conference system or room, such as a voice over Internet Protocol (VoIP) registration. Examples of a VoIP registration may include a session initiation protocol (SIP) registration, among others. and the conference system may then configure or initiate a network connection (e.g., a SIP connection) based on the registration, further reducing or eliminating work that would have previously required an information technology specialist. Further, the conference system may be adapted to provide information using the room properties to conference participants, so as to make using the conference system more convenient for the participants. As a result, the embodiments can improve affordability, scalability, modularity, extendibility, and interoperability for an operator, device, or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for a conference system 100. In one embodiment, the conference system 100 may comprise a computer-implemented conference system 100 having one or more software applications and/or components. Although the conference system 100 shown in FIG. 1 has a limited number of elements in a certain topology, it may be appreciated that the conference system 100 may include more or less elements in alternate topologies as desired for a given implementation.

In the illustrated embodiment shown in FIG. 1, the conference system 100 includes a room detection component 110, a database component 120, a conference configuration component 130, an optional notification component 140, and a data store 150. The room detection component 110 is generally operative to determine a room identifier (ID) of a room for a conference system or associated with a conference system. The database component 120 is generally operative to determine one or more room properties of the detected room by querying a database of room properties using the room ID. The conference configuration component 130 is generally operative to send control directives to configure one or more conference elements using the room properties. The notification component 140 is generally operative to provide information to conference participants using the room properties.

In various embodiments, the room properties determined by the database component 120 may comprise one or more of a plurality of properties. These properties may be any logical or physical property of the room applicable to the hosting, performance, or configuration of a conference system or online conference. The room properties may be one or more of the dimensions of the room, the time zone of the room, a presence of windows in the room, one or more properties of a lighting system in the room, one or more properties of an audio system in the room, one or more properties of a video system in the room, one or more properties of a room projector system, one or more properties of furniture in the room, and a SIP registration associated with the room, conference system, or a scheduled conference.

The database queried by database component 120 may be located either internal to the conference system 100, such as on data store 150, or may be a remote database accessed using a local-area or wide-area network, such as a building LAN or the Internet. The database may be a standalone system dedicated to the storage of room properties or the room properties may be one of many pieces of data stored by the database. This database may be maintained by information technology specialists for the purposes of providing information to conference systems. In various embodiments, this database may also be used to store information provided by the conference system, such as the current location of a mobile conference system, or information related to the current allocation or use of a conference system. For instance, the database may be used to check out a mobile conference system for use in a conference, and may be used to check in a mobile conference system to indicate that the conference system is available for use. Alternatively, the location and availability of conference systems may be maintained by a separate system, such as a scheduling system.

These room properties may be used by conference configuration component 130 to configure one or more conference elements. For instance, conference configuration component 130 may send control directives to configure one or more hardware, software or communication parameters for a conference element based on a given set of room properties. A conference element may generally comprise any internal components that comprise part of a conference system, as well as any components, devices or systems external to a conference system but in communication with a conference system. In some cases, for example, a conference element may comprise hardware or software components used by a conference system, such as room video system, a room audio system, a room projector system, a large wall touchscreen, and so forth. In other cases, for example, a conference element may comprise hardware or software components used by system external to a conference system, such as a room lighting system, a room security system, a room privacy system, a room detection system (e.g., fire, alarm, and emergency services), room biometric sensors, and so forth. It may be appreciated that these are merely a few examples of conference elements, and others exist as well. The embodiments are not limited in this context.

For example, in regards to a room lighting system, properties of a lightning system in the room may be used to determine that the conference system 100 may be operative to modify the lighting in the room using a lighting control system interface. Conference configuration component 130 may be operative to use the lighting control system interface to configure the room lighting. Such configuring may make use of a pre-existing lighting profile for conferencing. Such configuring may make use of properties of the lighting layout, the dimensions of the room, the time of the conference, the presence of windows in the room, or any other room property relevant to room lighting in order to determine proper lighting conditions for the conference and thereby configure the room lighting.

Continuing, conference configuration component 130 may send control directives to configure one or more of a video system in the room, an audio system in the room, and a projector system in the room. This configuring may include connecting the conference system to the video, audio, or projector system for display, playback, or recording of conference content. This configuring may include configuring parameters of the video, audio, or projector system for the display, playback, or recording of conference content. For example, a video display such as a television, computer monitor, or projector may be configured for the display of visual conference content, a speaker system may be configured for the playback of audio conference content, a video camera may be configured for the recording of video conference content, and a microphone may be configured for the recording of audio conference content.

The configuring of the video, audio, or projector system for display, playback, or recording of conference content may make use of one or more of the room properties determined by the database component 120. In some embodiments, the display, playback, or recording of conference content may be configured in response to the dimensions, seating, or lighting of a room, or in response to the presence of windows. For instance, any configurable parameter of a video or audio capture system may be configured according to those properties relevant to the capture of video or audio data. In one embodiment, the field of view or focus of a camera may be configured so as to best capture the occupants or seating area of a room, making use of room properties related to the dimension of a room, the furniture in the room, and the relative position of the camera in the room as compared to the furniture. In various embodiments, a video display or projection system may be configured in response to the dimensions, lightning conditions, and furniture in a room, so as to improve the visibility of any displayed conference content.

In various embodiments, conference configuration component 130 may be generally operative to configure various network connections for the conference system, such as a SIP connection, for example. Although some embodiments are described in a context of a SIP connection, it may be appreciated that the conference configuration component 130 may be arranged to automatically configure any type of network connection as desired for a given implementation. The embodiments are not limited in this context.

In one embodiment, this configuring may comprise logging the conference system into a SIP server. In some embodiments, a SIP registration may be associated with the room. In some embodiments, a SIP registration may be associated with the conference system or with a scheduled conference. In some embodiments, this SIP registration may be a room property determined by the database component 120. The conference configuration component 130 may be operative to use this registration information to configure the SIP connection for the conference system. The SIP registration information may comprise any information relevant to the configuration of a SIP connection, including, but not limited to, the address of a SIP server, an account on a SIP server, a password for a SIP server, or a certificate for a SIP server. This configuring may include configuring the SIP connection for display or playback on a video, audio, or projector system, such as the video, audio, or project system in the room, as described by the room properties.

In various embodiments, notification component 140 may be generally operative to provide information to conference participants using the room properties. This information may include any information relevant to conference participants, including one or more of the location of the conference, a room number of the conference, a street address of the conference, a GPS location of the conference, a time the room is open for the conference, an amount of time required to travel to the conference, details of seating in the room, a maximum number of people that may be seated in the room, the availability of seating in the room, an alert that the room is access-controlled, a reminder to gain permission to access an access-controlled room, or notification that the video, audio, or projection system are ready for participation in the conference. This information may be provided to all conference participants automatically, automatically sent to conference participants who previously requested specific information, or may be made available to conference participants upon request.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of inter-related states or events, such as in a state diagram. Moreover, not all acts illustrated in a methodology may be required for a novel implementation.

Figure 2:
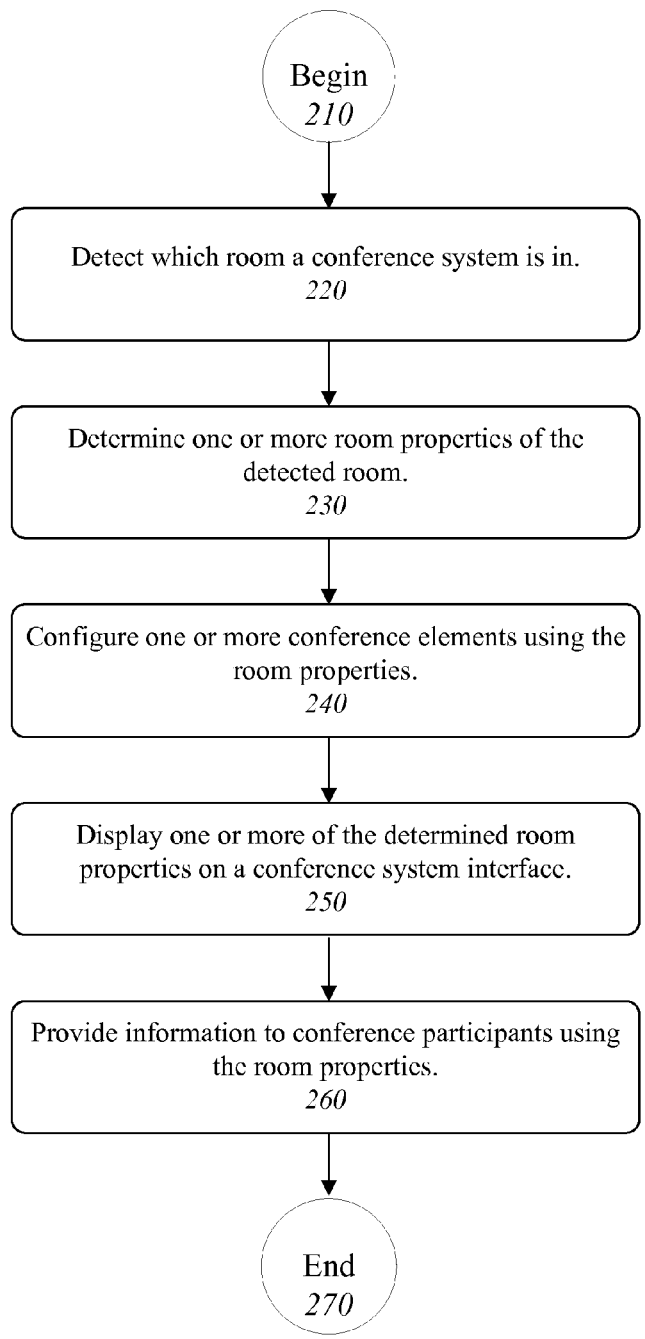
FIG. 2 illustrates an embodiment of a logic flow for the system of FIG. 1.

FIG. 2 illustrates one embodiment of a logic flow 200. The logic flow 200 may be representative of some or all of the operations executed by one or more embodiments described herein.

The operations recited in logic flow 200 may be embodied as computer-readable and computer-executable instructions that reside, for example, in data storage features such as a computer usable volatile memory, a computer usable non-volatile memory, and/or data storage unit. The computer-readable and computer-executable instructions may be used to control or operate in conjunction with, for example, a processor and/or processors. Although the specific operations disclosed in logic flow 200 may be embodied as such instructions, such operations are exemplary. That is, the instructions may be well suited to performing various other operations or variations of the operations recited in logic flow 200. It is appreciated that instructions embodying the operations in logic flow 200 may be performed in an order different than presented, and that not all of the operations in logic flow 200 may be performed.

In operation 210, the method begins.

In operation 220, the room a conference system is in is detected. For example, the room may be detected by room detection component 110 of conference system 100. Such detecting may comprise detecting any attribute which could be used to identify the room. Such detecting may comprise detecting one or more of an RFID tag, a GPS location, an indoor positioning system location, a visible tag, and an invisible tag such as an IR tag. In various embodiments, one or more of these mechanics may be used individually or in combination to determine the room the conference system is in. In various embodiments, detecting which room a conference system is in may comprise detecting the manual entry of a room location on an input device. In various embodiments, detecting which room a conference is in may comprise determining a room identifier (ID) for the room. In some embodiments, the room ID may be directly detected by the room detection component 110, such as a room ID encoded on a tag, such as an RFID, IR tag, or visible tag. In various embodiments, a visible tag may comprise a two-dimensional bar code, a three-dimensional bar code, or any other visible tag, tag in the visible spectrum, or method of encoding data into a visible picture. Additional or alternative information may be encoded on a tag, such as the name of the room, the location of the room, an index of the room, or an address of the room. In some embodiments, this information may be used as a room ID. In some embodiments, this information may be used to determine a room ID, such as by comparing the captured information to information stored in a database or catalog that matches one or more of the name of a room, the location of a room, an index of a room, or an address of a room to a room ID. In some embodiments, there may be tags using both the visible spectrum and tags using an invisible spectrum, such as an IR tag. In some embodiments, only one may be used. In some embodiments, the room detection component 110 may attempt to detect both visible and invisible tags. In some embodiments, if the room detection component 110 detects both visible and invisible tags it will capture and use information from both. In some embodiments, if the room detection component only detects one of a visible and invisible tag it will only capture information from that type of tag.

In some embodiments, the room ID may be indirectly determined by comparing captured information, such as a GPS or indoor positioning system location, to a database or catalog that matches locations to room IDs. In some embodiments, room detection component 110 may iteratively attempt different methods of determining a room ID, first attempting a preferred form of detecting and then attempting additional forms of detecting if the preferred form of detecting fails. In some embodiments, this may comprise attempting to detect a tag and, if no tag is detected, proceeding to use location information, such as a GPS or indoor positioning system location, to indirectly determine a room ID.

In operation 230, one or more room properties of the detected room may be determined. In various embodiments, this determination may be made by querying a database of room properties. Such querying of room properties may be performed by database component 120. In various embodiments, querying the database may use the room ID. In various embodiments, the room properties may comprise one or more of the dimensions of the room, the time zone of the room, a presence of windows in the room, one or more properties of a lighting system in the room, one or more properties of an audio system in the room, one or more properties of a video system in the room, one or more properties of room projector system, one or more properties of furniture in the room, a protocol registration (e.g., a SIP registration) associated with the room, and so forth.

In operation 240, one or more conference elements may be configured using the room properties. For example, the conference elements may be configured by conference configuration component 130. In various embodiments, the configured conference elements may comprise one or more of room lighting, room video, room audio, and a room projector system. In various embodiments, the configured conference elements may comprise configuring a SIP connection for the conference system. This configuring may comprise logging the conference system into a SIP server.

In operation 250, one or more of the determined room properties may be displayed on a conference system interface. These room properties may be any of the room properties determined in operation 230. Such display may allow for participants to be aware of room properties that may contribute to understanding the context of the conference. Such display may be on a local display on the conference system, or may be published remotely, such as using a web page or other communication over the Internet.

In operation 260, information may be provided to conference participants using the room properties. Such providing of information may be performed by notification component 140. This information may include any information relevant to conference participants, including one or more of the location of the conference, a room number of the conference, a street address of the conference, a GPS location of the conference, a time the room is open for the conference, an amount of time required to travel to the conference, details of seating in the room, a maximum number of people that may be seated in the room, the availability of seating in the room, an alert that the room is access-controlled, a reminder to gain permission to access an access-controlled room, or notification that the video, audio, or projection system are ready for participation in the conference. The information provided to the participants may include any or all of the room properties determined by the conference system. This information may be provided to all conference participants automatically, automatically sent to conference participants who previously requested specific information, or may be made available to conference participants upon request.

In operation 270, the method stops.

It will be appreciated by those skilled in the art that the described methods and systems can be applied to a number of applications in addition to conferencing. For instance, the system may be used as part of a security system, in which individual security elements such as cameras and microphones determine their location and configure themselves automatically according to their location. The system may make use of properties beyond or in place of properties of a room, such as properties of a specific location, properties of a building, or any other location-based properties.

Figure 3:
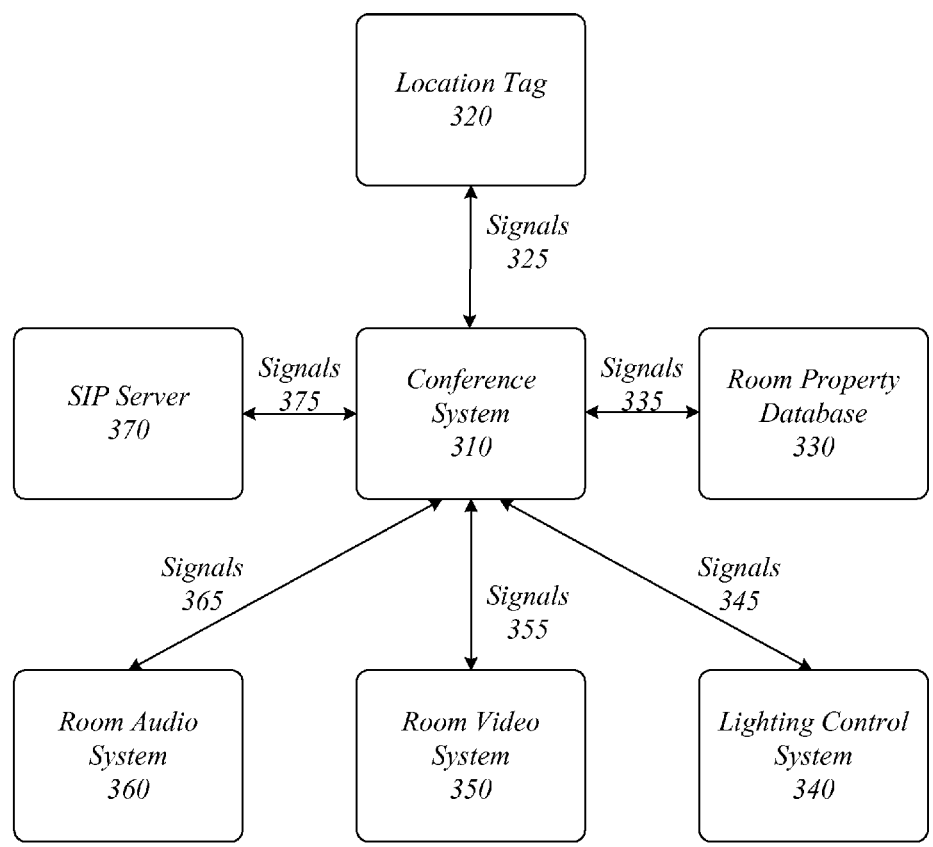
FIG. 3 illustrates a message flow for the system of FIG. 1

FIG. 3 illustrates a block diagram of a message flow. The message flow may be representative of some or all of the operations executed by one or more embodiments described herein.

In the illustrated embodiment shown in FIG. 3, the conference system 310 communicates with a plurality of elements or devices in order to determine its location and configure the system and room for a conference.

In various embodiments, in order to determine its location, the conference system exchanges signals 325 with a location tag 320. This may represent one embodiment of operation 220, in which the room a conference system is in is detected. The location tag 320 may comprise an RFID tag, an IR tag, a visible tag, or any other form of tag which may be used to indicate a location. The exchange of signals 325 may comprise passively receiving a signal continuously broadcast by location tag 320, or may comprise actively querying for a room location or broadcasting a signal to activate any tags in that location. The exchange of signals 325 may be carried out by room detection component 110. The exchange of signals 325 may include the conference system 310 receiving a room ID from the location tag 320.

In various embodiments, in order to determine the properties of the room, conference system 310 may exchange signals 335 with a room property database 330. This exchange of signals may represent one embodiment of operation 230, in which one or more room properties of a room are determined. The exchange of signals 335 may be carried out by database component 120. Room property database 330 may be located internally to the conference system 310, such as on data store 150, or may be a remote database accessed using a local-area or wide-area network. Signals 335 may include the conference system 310 sending the room ID to the room property database 330. The room property database 330 may use the room ID to retrieve one or more room properties of the room. These properties may be any property of the room applicable to the hosting, performance, or configuration of a conference system or online conference. The room properties may be one or more of the dimensions of the room, the time zone of the room, a presence of windows in the room, one or more properties of a lighting system in the room, one or more properties of an audio system in the room, one or more properties of a video system in the room, one or more properties of a room projector system, one or more properties of furniture in the room, and a SIP registration associated with the room. Signals 335 may include the transmission of any of these room properties from room property database 330 to the conference system 310.

The signals 335 may also include conference system 310 registering or recording its location and status with the room property database 330. In various embodiments, the room database 330 may also be used to store information provided by the conference system, such as the current location of a mobile conference system, or information related to the current allocation or use of a conference system. For instance, the database may be used to check out a mobile conference system for use in a conference, and may be used to check in a mobile conference system to indicate that the conference system is available for use. Alternatively, the location and availability of conference systems may be maintained by a separate system, such as a scheduling system.

In various embodiments, the room properties provided by the room property database 330 may be used to configure one or more conference elements. This exchange of signals may represent one embodiment of operation 240, in which one or more conference elements may be configured by conference configuration component 130.

In one embodiment, the room properties may include properties of a lighting control system 340 and may be used by conference system 310 to determine that the conference system is operative to modify the lightning in the room using a lightning control system interface. Signals 345 may comprise control signals sent to and received from a lighting control system interface of lighting control system 340 in order to configure the room lighting. Such configuring may make use of a pre-existing lighting profile for conferencing. Such configuring may make use of properties of the lighting layout, the dimensions of the room, the time of the conference, the presence of windows in the room, or any other room property relevant to room lighting in order to determine proper lighting conditions for the conference and thereby configure the room lighting.

In one embodiment, the room properties may include properties of a room video system 350 and may be used by conference system 310 to determine that room video system 350 is operative to be configured and used by conference system 310 for use in the conference. Signals 355 may comprise control signals sent to and received from the room video system 350 in order to configure and use the room video system. Configuring room video system 350 may comprise configuring a television, computer monitor, projector, or any other video display device for the display of conference content. The configuring of room video system 350 for display may include using any or all of the room properties received from room property database 330 relevant to the configuration of display equipment, such as adjusting the display for optimal viewing in relation to the dimensions, seating, or lighting of a room, or in response to the presence of windows.

Configuring the room video system 350 may comprise configuring a camera for the recording of video content for the conference. The configuring of room video system 350 for recording may include using any or all of the room properties received from room property database 330 relevant to the configuration of video recording equipment, such as adjusting the recording equipment for optimal recording in relation to the dimensions, seating, or lighting of a room, in response to the presence of windows.

In one embodiment, the room properties may include properties of a room audio system 360 and may be used by conference system 310 to determine that room audio system 360 is operative to be configured and used by conference system 310 for use in the conference. Signals 365 may comprise control signals sent to and received from the room audio system 360 in order to configure and use the room audio system. Configuring room audio system 360 may comprise configuring a speaker, speaker system, headset, plurality of headsets, or any other audio playback equipment for the playback of audial conference content. The configuring of room audio system 360 for playback may include using any or all of the room properties received from room property database 330 relevant to the configuration of display equipment, such as adjusting the playback for optimal hearing in relation to the dimensions or seating of a room.

Configuring the room audio system 360 may comprise configuring a microphone for the recording of audio content for the conference. The configuring of room audio system 360 for recording may include using any or all of the room properties received from room property database 330 relevant to the configuration of audio recording equipment, such as adjusting the recording equipment for optimal recording in relation to the dimensions or seating of a room.

In one embodiment, the room properties may include properties of a SIP server 370 and may be used by conference system 310 to determine that a SIP registration is associated with the room, conference system, or a scheduled conference. Signals 375 may comprise control signals sent to and received from the SIP server 370 in order to configure and use a SIP connection for the conference. The SIP registration information may comprise any information relevant to the configuration of a SIP connection, including, but not limited to, the address of a SIP server, an account on SIP server 370, a password for the SIP server, or a certificate for the SIP server. This configuring may include configuring the SIP connection for display or playback on a video, audio, or projector system, such as the video, audio, or project system in the room, as described by the room properties.

Figure 4:
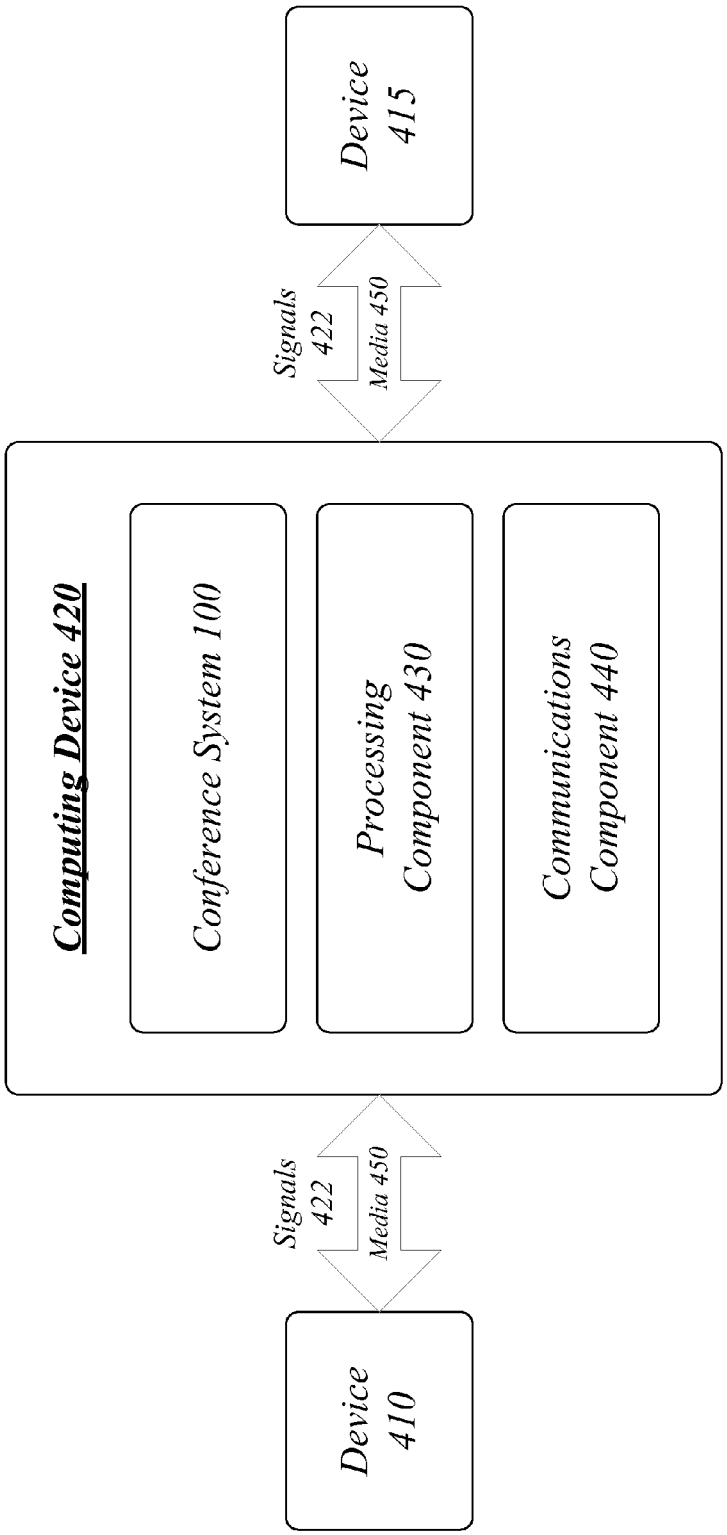
FIG. 4 illustrates an embodiment of a centralized system for the system of FIG. 1.

FIG. 4 illustrates a block diagram of a centralized system 400. The centralized system 400 may implement some or all of the structure and/or operations for the conference system 100 in a single computing entity, such as entirely within a single computing device 420.

The computing device 420 may execute processing operations or logic for the system 100 using a processing component 430. The processing component 430 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 420 may execute communications operations or logic for the system 100 using communications component 440. The communications component 440 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 440 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 450 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 450.

The computing device 420 may communicate with other devices 410, 415 over a communications media 450 using communications signals 422 via the communications component 440.

In various embodiments, and in reference to FIG. 1, communications component 440 may comprise all or some of room detection component 110, conference configuration component 130, and notification component 140. In reference to FIG. 2, Communications component 440 may be operative, in conjunction with processing component 430, to carry out operations 220, 230, 240, and 260. As such, communications components may be operative to carry out communication regarding to the configuration and use of lighting control system 340, room video system 350, room audio system 360, and SIP server 370.

In various embodiments, and in reference to FIG. 3, device 410 may correspond to location tag 320. Communications component 440 may be operative to communicate with the location tag for the purposes of determining which room the conference system is in. This communication may comprise the sending and receiving of signals 422 over media 450 corresponding to the sending and receiving of signals from an RFID tag, visible tag, or IR tag. The received signals may include a room ID identifying the room which the conference is in.

In various embodiments, and in reference to FIG. 3, device 415 may correspond to SIP server 370. Communications component 440 may be operative to communicate with the SIP server for the purposes of configuring a SIP connection for use during the conference. This communication may comprise the sending and receiving of signals 422 over media 450 corresponding to SIP signals for setting up and using a SIP connection.

In various embodiments, computing device 420 may contain a local room properties database. In reference to FIG. 1, this database may be accessed by database component 120. The room properties stored by the database may be any property of the room applicable to the hosting, performance, or configuration of a conference system or online conference. The room properties may be one or more of the dimensions of the room, the time zone of the room, a presence of windows in the room, one or more properties of a lighting system in the room, one or more properties of an audio system in the room, one or more properties of a video system in the room, one or more properties of a room projector system, one or more properties of furniture in the room, and a SIP registration associated with the room, conference system, or a scheduled conference.

Figure 5:
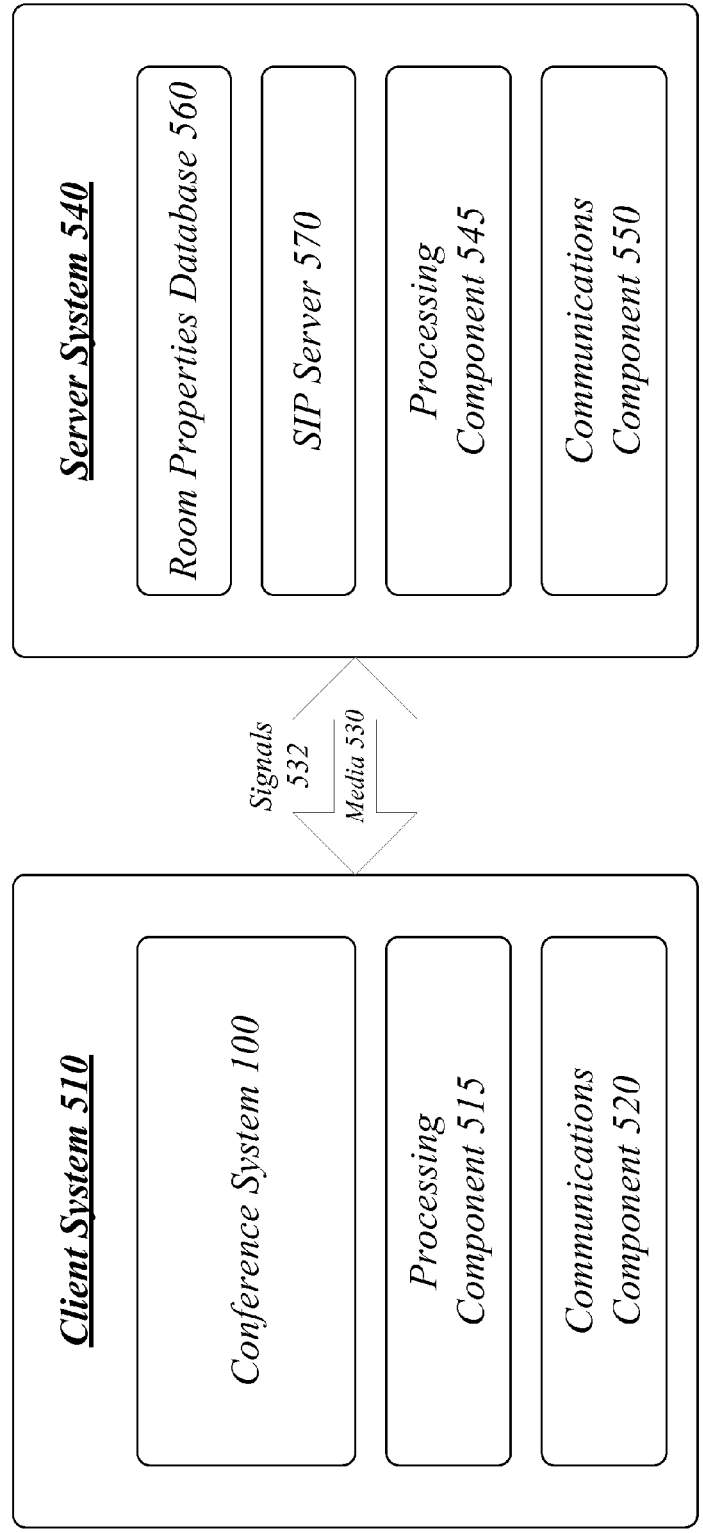
FIG. 5 illustrates an embodiment of a distributed system for the system of FIG. 1.

FIG. 5 illustrates a block diagram of a distributed system 500. The distributed system 500 may distribute portions of the structure and/or operations for the systems 100, 400 across multiple computing entities. Examples of distributed system 500 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The client system 510 and the server system 540 may process information using the processing components 515 and 545, which are similar to the processing component 430 described with reference to FIG. 4. The client system 510 and the server system 454 may communicate with each over a communications media 530 using communications signals 532 via communications components 520 and 550, which are similar to the communications component 440 described with reference to FIG. 4.

In one embodiment, for example, the distributed system 500 may be implemented as a client-server system. A client system 510 may implement the room conference system 100, including room detection component 110, database component 120, conference configuration component 130, notification component 140, and data store 150. A server system 540 may implement the room properties database and SIP server.

In various embodiments, the client system 510 may comprise or employ one or more client computing devices and/or client programs that operate to perform various methodologies in accordance with the described embodiments.

In various embodiments, the server system 540 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 540 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs such as Microsoft® Office Communications Server (OCS) for managing incoming and outgoing messages, messaging server programs such as Microsoft® Exchange Server for providing unified messaging (UM) for e-mail, voicemail, VoIP, instant messaging (IM), group IM, enhanced presence, and audio-video conferencing, and/or other types of programs, applications, or services in accordance with the described embodiments.

In various embodiments, the server system 540 may include a room properties database 560. The room properties database 560 may be accessed by conference system 100 using communication component 520 in order to retrieve room properties of a room. The room properties stored by the database may be any property of the room applicable to the hosting, performance, or configuration of a conference system or online conference. The room properties may be one or more of the dimensions of the room, the time zone of the room, a presence of windows in the room, one or more properties of a lighting system in the room, one or more properties of an audio system in the room, one or more properties of a video system in the room, one or more properties of a room projector system, one or more properties of furniture in the room, and a SIP registration associated with the room, conference system, or a scheduled conference.

In various embodiments, the server system 540 may include a SIP server 570. The SIP server may be operative to provide SIP services to one or more client systems, including client system 510. Client system 510 may communicate with SIP server 570 by means of communications components 520 and 550 communicating using signals 532 over media 530.

Signals 532 may include signals for the configuration of a SIP connection for use by conference system 100 and may also include signals relating to the performance of a SIP connection for conference system 100.

Figure 6:
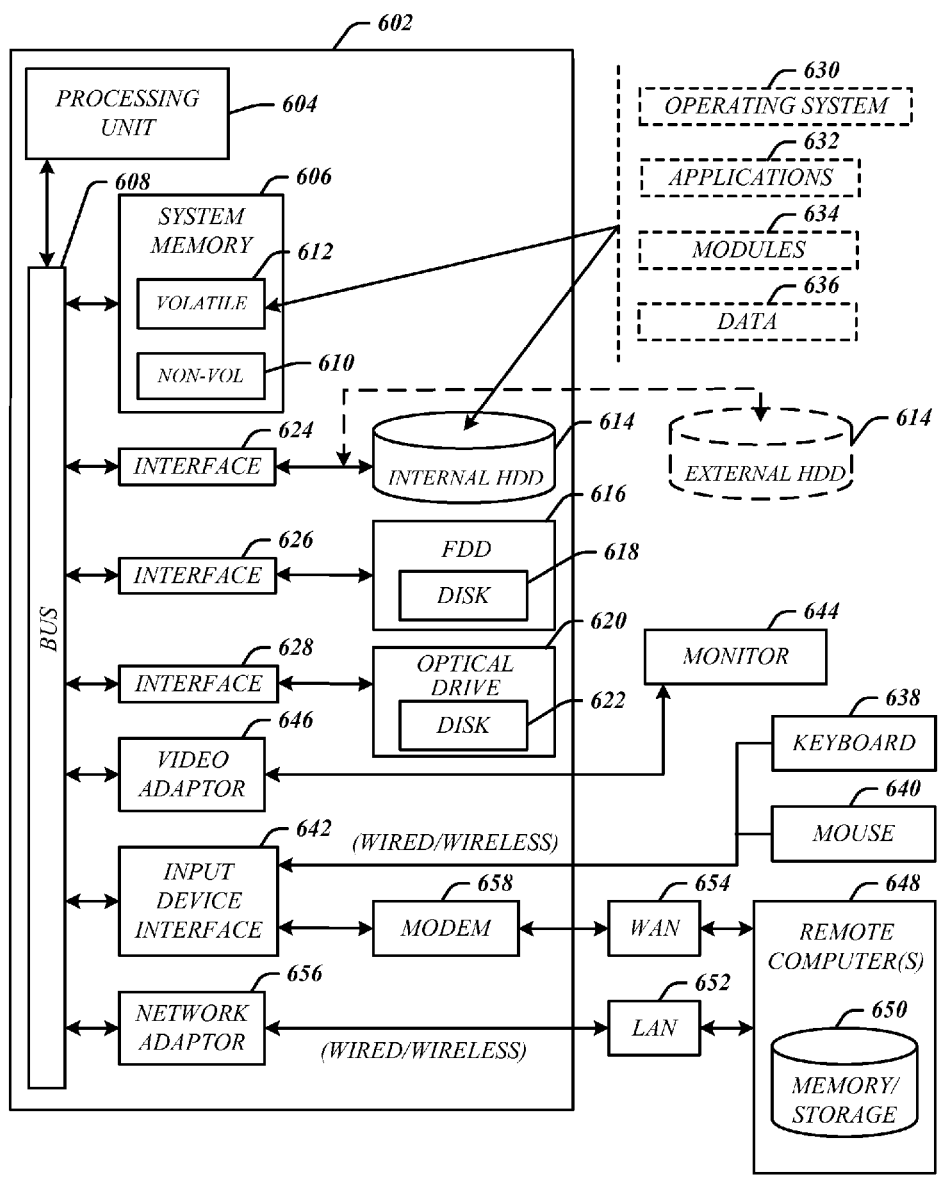
FIG. 6 illustrates an embodiment of a computing architecture.

FIG. 6 illustrates an embodiment of an exemplary computing architecture 600 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 600 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 600 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors. Dual microprocessors and other multi-processor architectures may also be employed as the processing unit 604. The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program components can be stored in the drives and memory units 610, 612, including an operating system 630, one or more application programs 632, other program components 634, and program data 636.

The one or more application programs 632, other program components 634, and program data 636 can include, for example, the room detection component 110, the database component 120, the conference configuration component 130, and the notification component 140.

A user can enter commands and information into the computer 602 through one or more wire/wireless input devices, for example, a keyboard 638 and a pointing device, such as a mouse 640. Other input devices may include a microphone, an infra-red (IR) remote control, a joystick, a game pad, a stylus pen, touch screen, or the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program components or modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 7:
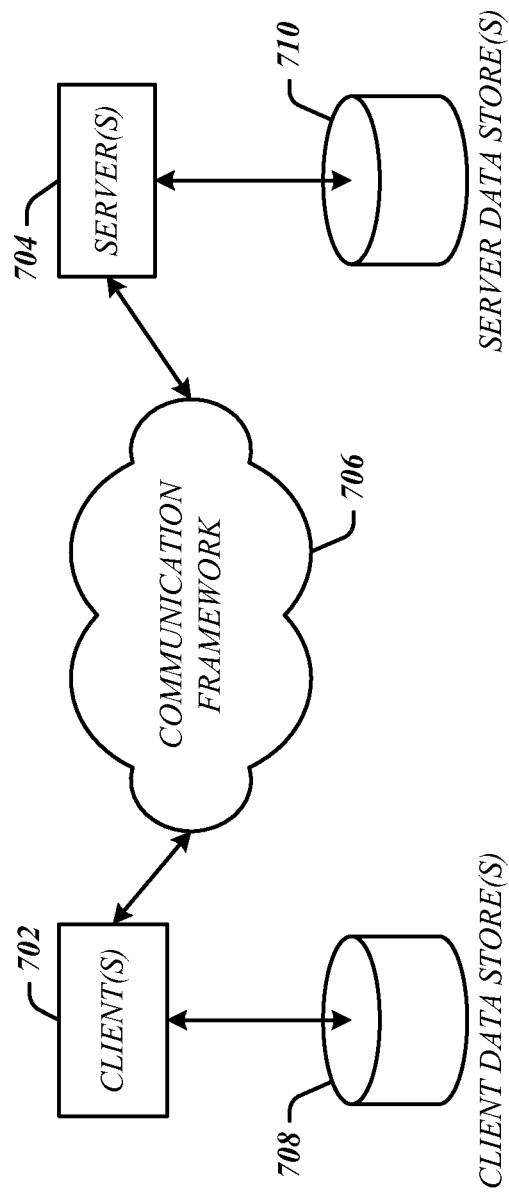
FIG. 7 illustrates an embodiment of a communications architecture.

FIG. 7 illustrates a block diagram of an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, and so forth. The embodiments, however, are not limited to implementation by the communications architecture 700.

As shown in FIG. 7, the communications architecture 700 comprises includes one or more clients 702 and servers 704. The clients 702 may implement the client system 510. The servers 704 may implement the server system 540. The clients 702 and the servers 704 are operatively connected to one or more respective client data stores 708 and server data stores 710 that can be employed to store information local to the respective clients 702 and servers 704, such as cookies and/or associated contextual information.

The clients 702 and the servers 704 may communicate information between each other using a communication framework 706. The communications framework 706 may implement any well-known communications techniques and protocols, such as those described with reference to system 300. The communications framework 706 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method, comprising:
    detecting one or more of a radio-frequency identification (RFID) tag or an infrared (IR) tag using a room detection component of a conference system, the detected IR tag or the RFID tag operative to store encoded data corresponding to a room where a conference system is located;
    detecting the room where the conference system is located using the detected RFID tag or IR tag and the room detection component;
    determining one or more room properties associated with the detected room using a database component of the conference system, the one or more determined room properties comprising at least one of: dimensions of the detected room, a time zone of the detected room, a presence of windows in the detected room, or one or more properties of a lighting system in the detected room, one or more properties of an audio system in the detected room, one or more properties of a video system in the detected room, one or more properties of a room projector system, or one or more properties of furniture in the detected room;
    determining lighting conditions for a scheduled conference in the detected room based upon the one or more determined room properties using a conference configuration component of the conference system; and
    sending a control directive using the conference configuration component of the conference system to configure one or more conference elements in the detected room in response to the determined lighting conditions using one or more properties of a lighting layout profile or a time of the scheduled conference, the one or more conference elements comprising one or more of room lighting, room video, room audio, or a room projector system used by the conference system for the scheduled conference; and
    provisioning the conference system for conference participants and using a notification component of the conference system to provide conference information to the conference participants.

2. The method of claim 1, comprising detecting the room where the conference system is located using a room identifier (ID) associated with the detected RFID tag or IR tag.

3. The method of claim 2, wherein the step of determining one or more room properties of the detected room is performed by querying a database of room properties using the room ID.

4. The method of claim 1, comprising configuring the one or more conference elements by logging the conference system into a session initiation protocol (SIP) server.

5. The method of claim 1, comprising displaying one or more of the determined room properties on a conference system interface.

6. The method of claim 1, comprising providing information to the conference participants using the one or more determined room properties.

7. An article of manufacture comprising a hardware memory containing instructions that when executed by a mobile conference system cause the mobile conference system to:
    detect, using a room detection component of the mobile conference system, attribute data corresponding to a location of the mobile conference system;
    determine, using the room detection component, a room where the mobile conference system is located based upon the attribute data;
    determine, using a database component of the mobile conference system, one or more room properties of the room comprising at least one physical or logical property relevant to adaptation of the mobile conference system to the determined room, the determined room properties comprising one or more of: dimensions of the determined room, a time zone of the determined room, a presence of windows in the determined room, one or more properties of a lighting system in the determined room, one or more properties of an audio system in the determined room, one or more properties of a video system in the determined room, one or more properties of a room projector system in the determined room, or one or more properties of furniture in the determined room; and
    send, using a conference configuration component of the mobile conference system, control directives to configure one or more parameters for internal or external components of the mobile conference system using the determined one or more room properties, the one or more parameters for internal or external components of the mobile conference system comprising room lighting, room video, room audio, or a room projector system, in response to the determined room properties,
    the control directives comprising a control directive to configure at least one of a field of view or a focus of a camera to capture video data or audio data from room occupants or a seating area of the room based upon the determined room properties corresponding to at least one of the dimensions of the determined room, the one or more properties of the furniture in the determined room, or a relative position of the camera in the determined room as compared to the one or more properties of the furniture in the determined room,
    the control directives further comprising a control directive to configure a video display or projection system in response to the dimensions of the determined room, lightning conditions of the determined room, or the one or more properties of the furniture in the determined room.

8. The article of claim 7, further comprising instructions that when executed enable the mobile conference system to:
    determine a room identifier (ID); and
    query a database of room properties using the room ID.

9. The article of claim 7, further comprising instructions that when executed by the conference system cause the mobile conference system to log the mobile conference system into a session initiation protocol (SIP) server.

10. The article of claim 7, further comprising instructions that when executed by the mobile conference system cause the mobile conference system to provide information to conference participants using the determined room properties.

11. A conference system, comprising:
    a processor;
    a room detection component operative on the processor to detect a room where the conference system is located and determine a room identifier (ID) of the detected room;
    a database component operative on the processor to determine one or more room properties of the detected room by querying a database of room properties using the room ID, wherein at least one room property comprises one or more of: dimensions of the detected room, a time zone of the detected room, a presence of windows in the detected room, one or more properties of a lighting system in the detected room, one or more properties of an audio system in the detected room, one or more properties of a video system in the detected room, one or more properties of a room projector system, or one or more properties of furniture in the detected room;

a conference configuration component operative on the processor to send a control directive to configure, in response to the determined room properties, one or more conference elements of the detected room applicable to host a conference by the conference system, the one or more conference elements comprising one or more of room lighting, room video, room audio, or a room projector of the detected room used by the conference system for the conference, the conference configuration component further operative to send a control directive to configure parameters of at least one of the video system of the detected room, the audio system of the detected room, or the room projector system of the detected room for display, playback, or recording of the conference content of the conference, the display, playback, or recording of the conference content are configured in response to at least one of the dimensions of the detected room, seating of the detected room, the presence of windows in the detected room, or the lighting system of the detected room; and a notification component operative to provide protocol registration information to conference participants to configure a connection with the conference system being hosted in the detected room.

12. The conference system of claim 11, the conference configuration component further operative to log the conference system into a session initiation protocol (SIP) server.

13. The conference system of claim 11, wherein the room detection component further operative to detect the room identifier using one or more of a radio-frequency identification (RFID) tag, a global positioning satellite (GPS) system location, an indoor positioning system location, or an infrared (IR) tag.

* * * * *